United States Patent [19]

Brown et al.

[11] 3,887,525

[45] June 3, 1975

[54] PROCESS FOR PREPARING SOLVENT-SOLUBLE POLYURETHANES

[75] Inventors: James Peter Brown; Edwin Gordon Jenner; John Wilcock, all of Blackley, England

[73] Assignee: Imperial Chemical Industries Limited, London, England

[22] Filed: Dec. 13, 1973

[21] Appl. No.: 424,424

Related U.S. Application Data

[63] Continuation of Ser. No. 235,069, March 15, 1972, abandoned.

[30] Foreign Application Priority Data

Mar. 30, 1971 United Kingdom............ 8160/71

[52] U.S. Cl............................. 260/77.5 AA, 260/30.8 DS, 260/32.6 N; 264/176; 264/331
[51] Int. Cl... C08g 22/14; C08g 53/00; C08g 53/20
[58] Field of Search ........................ 260/77.5 AA

[56] References Cited
UNITED STATES PATENTS

| 2,929,800 | 3/1960 | Hill | 260/77.5 AM |
| 3,192,185 | 6/1965 | Achterhof et al. | 260/77.5 AA |
| 3,214,411 | 10/1965 | Saunders et al. | 260/77.5 AA |
| 3,233,025 | 2/1966 | Frye et al. | 260/77.5 AA |
| 3,362,793 | 1/1968 | Massoubre | 260/77.5 AA |
| 3,635,904 | 1/1972 | Briggs et al. | 260/77.5 AA |
| 3,639,652 | 2/1972 | Mommaerts et al. | 260/77.5 AA |
| 3,642,964 | 2/1972 | Rausch et al. | 260/77.5 AA |
| 3,689,443 | 9/1972 | Fensch | 260/77.5 AA |
| 3,725,340 | 4/1973 | Erdmenger et al. | 260/77.5 AA |
| 3,776,877 | 12/1973 | Kelley et al. | 260/77.5 AA |

OTHER PUBLICATIONS

Saunders and Frisch —Polyurethanes, Part II, Interscience, N.Y., 1964, pages 376–381.

*Primary Examiner*—H. S. Cockeram
*Attorney, Agent, or Firm*—Cushman, Darby & Cushman

[57] ABSTRACT

A process for the manufacture of solvent-soluble polyurethane elastomers by reacting together a polymeric polyol, a low molecular weight diol and an organic diisocyanate in amount at most equivalent to the polymeric polyol and the diol together, to give a solvent-insoluble polyurethane product, and then heating and preferably mechanically working the insoluble product until a solvent-soluble product is obtained.

10 Claims, No Drawings

PROCESS FOR PREPARING SOLVENT-SOLUBLE POLYURETHANES

This is a continuation of application Ser. No. 235,069 filed Mar. 15, 1972, and now abandoned.

This invention relates to polyurethanes and more particularly to a process for the manufacture of solvent-soluble polyurethane elastomers.

According to the invention there is provided a process for the manufacture of solvent-soluble polyurethane elastomers from a substantially linear polymeric polyol having a molecular weight above 800, a diol having a molecular weight of at most 250 and an organic diisocyanate in amount at most equivalent to the polymeric polyol and the diol together, which comprises reacting together the organic diisocyanate and the polymeric polyol to form an isocyanate-ended prepolymer, further reacting the prepolymer with the diol to form a solvent-insoluble polyurethane product and then heating the solvent-insoluble polyurethane product until a solvent-soluble product is obtained.

Although the solvent-insoluble polyurethane product can be converted into a soluble product by the action of heat alone, it is preferred to mechanically work the insoluble product at an elevated temperature until the desired solubility is achieved.

As examples of polymeric polyols having a molecular weight above 800, there may be mentioned polyether-thioethers and polyacetals but it is preferred to use a polyester or a polyether. These polymers should preferably be linear but may be slightly branched and should either be liquid or have a melting point not higher than 60°C.

As examples of polyethers which can be used there may be mentioned polymers and copolymers of cyclic oxides, for example 1:2-alkylene oxides such as ethylene oxide, epichlorohydrin, 1:2-propylene oxide, 1:2-butylene oxide and 2:3-butylene oxide, oxycyclobutane and substituted oxycyclobutanes and tetrahydrofuran. There may also be mentioned polyethers such as are prepared for example by the polymerisation of an alkylene oxide in the presence of a basic catalyst and water, glycol or a primary monoamine. Mixtures of such polyethers may be used. The preferred polyethers are polytetrahydrofuran polymers having a molecular weight between 1,000 and 2,500, and especially polypropylene glycols having a molecular weight between 1,000 and 2,500. These latter polyethers provide a polyurethane product which, when applied from solution, has a level of physical and mechanical properties not previously attained with this class of polyol.

As examples of polyether-thioethers which can be used there may be mentioned the products of the self-condensation of thioglycols such as thiodiglycol or of the condensation of thioglycols with glycols.

The polyesters which can be used may be made by conventional means from aliphatic dicarboxylic acids and dihydric alcohols. Suitable dicarboxylic acids include succinic, glutaric, adipic, pimelic, suberic, azelaic, and sebacic acids and mixtures of these. Small proportions, up to 20 mole percent of phthalic, isophthalic and terephthalic acids can also be used. Suitable dihydric alcohols include ethylene glycol, 1:2-propylene glycol, diethylene glycol, dipropylene glycol, trimethylene glycol, 1:2-, 1:3-, 2:3-, and 1:4-butylene glycols, neopentyl glycol, pentamethylene glycol and hexamethylene glycol and mixtures of these. Small proportions of polyols containing more than two hydroxyl groups, for example glycerol, trimethylolpropane or pentaerythritol may also be used. The acid value of the polyester used should be less than 6.0 and preferably less than 3. The preferred polyesters have melting points below 60°C and are derived from glycols having from 2 to 8 carbon atoms and dicarboxylic acids having from 4 to 10 carbon atoms. Particularly suitable are polyesters of molecular weight between 1,000 and 2,500 derived from such dicarboxylic acids, especially adipic acid, and a glycol or mixture of glycols. Polyesters obtained by polymerisation of cyclic lactones or mixtures of cyclic lactones such as caprolactone and its alkyl substituted derivatives are also suitable.

As examples of polyacetals which can be used there may be mentioned the reaction products of aldehydes, such as formaldehyde, acetaldehyde and butyraldehyde, with dihydric alcohols such as propylene glycol, butylene glycols and diethylene glycol.

It is preferred that the organic diisocyanate used in the new process should be one having a symmetrical structure, for example, hexamethylene-1,6-diisocyanate, tetramethylene-1,4-diisocyanate, 4,4'-diphenylmethane diisocyanate, 1,4-phenylene diisocyanate and 1,5-naphthylene diisocyanate. Hexamethylene-1,6-diisocyanate and 4,4'-diphenylmethane diisocyanate are particularly suitable.

The diol having a molecular weight of at most 250 used in the second step of the new process is preferably one which is capable of reacting with an organic diisocyanate as the sole other reactant to form a crystalline polymer of melting point at least 150°C. Preferred examples of such diols are ethylene glycol, 1,4-butanediol, 1,6-hexanediol, 1,4-bis-(β-hydroxyethoxy)benzene and 1,6-cyclohexandiol.

Small amounts of one or more compounds of the type known to be effective in stabilisation of polymers to light or to oxidative or thermal discolouration or degradation such as alkyl substituted phenolic compounds, may be added. Fillers and pigments can also be added if desired. To minimise interference with the polymer-forming reaction of the diisocyanate, these additives should be dry.

The first stage of the process, between the organic diisocyanate and the polymeric polyol to form a prepolymer, is preferably carried out under slightly acidic conditions, since the solvent-insoluble polyurethane product obtained at the conclusion of the second stage, i.e. reaction of the prepolymer with the diol, is then obtained in a more readily mechanically workable form. The necessary degree of acidity may be provided by adding a mineral acid, an organic acid or a compound which reacts with formation of a mineral acid or an organic acid, to the polymeric polyol. As examples of acidic or acid-forming compounds which may be used there may be mentioned adipic acid and benzoyl chloride. The amount of acid present should be such as is equivalent to an amount of hydrogen chloride corresponding up to 0.02 percent by weight of diisocyanate; the lower limit of acidity varies with different polymers, but whether sufficient is present can readily be determined by a trial, and, if necessary, sufficient acid can be added to the mixture to bring the acidity to a desirable level. When an organic acid is added, the acid dissociation constant and potential reactivity with isocyanates should be taken into consideration and if necessary an appropriately larger amount used. Thus, it is usually appropriate to add to the polymeric polyhydroxy-compound about 0.1 percent by weight of adipic acid prior to its reaction with the diisocyanate. The organic diisocyanate may itself contain sufficient acidity to make any addition of an acid compound unnecessary. The acidity of the diisocyanate can be measured by adding a measured weight of the diisocyanate to a large excess of n-propanol, standing the mixture at ordinary temperatures for about 10 minutes to allow the n-propanol and diisocyanate to react together completely, then titrating with a standard solution of potassium hydroxide in alcohol.

The reaction between the diisocyanate and the polymeric polyol is carried out at a temperature not exceeding 100°C and preferably at 50° to 100°C. The second stage of the process, between the prepolymer and the diol, is carried out by mixing the diol, at a temperature of from 10° to 150°C with the prepolymer heated to a temperature of 60° to 150°C and holding the mixture at a temperature of from 70° to 170°C until it solidifies. If necessary, the reaction can be completed by subsequently heating the solid product, for example, at a temperature up to 120°C for a period of up to 40 hours, or for longer periods at lower temperatures.

The second stage of the process is preferably carried out in a continuous manner.

For example, the prepolymer and the diol, at a temperature within the staged ranges can be independently fed to a heated mixing chamber containing a device for mixing the two reactants, and so constructed that the liquid mixture issues onto or into a further heated receptacle such as a moving belt which passes over a platen, heated to the required temperature. A particularly suitable belt is made from glass cloth coated with polytetrafluoroethylene, since the solid polyurethane product does not adhere to such a belt. The platen should be such as to provide a temperature not exceeding 170°C in the mixture. After a short time the mixture solidifies and may be subjected to a final heating step in the form of a sheet or if desired may be broken into strips or granules before heating. Conventional catalysts for isocyanate reactions, such as organic and inorganic bases and organometallic compounds may be added with the diol if necessary to accelerate the rate of solidification of the reaction mixture; antioxidants of the phenolic type can be added to minimise discolouration.

This final curing stage is preferably carried out in absence of oxygen and moisture, for example, in a closed container, under a blanket of nitrogen or in a vacuum oven.

The solid polyurethane product which is obtained at the conclusion of the second stage of the process in insoluble in powerful solvents, for example, dimethyl sulphoxide, dimethyl acetamide and dimethyl formamide.

In the final stage of the process the solvent insoluble polyurethane product, granulated if necessary, is heated, and preferably mechanically worked at an elevated temperature until a solvent soluble product is obtained. The temperature at which this operation is carried out is generally from 180° to 220°C. The mechanical working may be carried out by subjecting the polyurethane product to an injection moulding operation, the preferred temperature in this case being 180°–190°C, by passing the product through a heated barrel by means of a screwed or scrolled axially rotatable shaft, in which case the temperature is preferably 200°–210°C, or in general by any means whereby the solid product is subjected to the combined action of heat and shear forces. At the preferred temperature the working operation is carried out for a time of 1 to 60 minutes, preferably 6 to 12 minutes. After this final stage of the process the product is found to be readily soluble in powerful solvents such as dimethyl formamide.

The products of the present invention are thermoplastic elastomers, and are valuable as one-pack coating elastomers, especially for textiles.

The invention is illustrated but not limited by the following Examples, in which parts and percentages are by weight.

EXAMPLE 1

237 Parts of a polypropylene glycol having a hydroxyl value of 59.3 mg.KOH/g. were dehydrated by agitation at 110°C at a pressure of 100 mm.Hg. until the moisture content was less than 0.015 percent. The dry glycol was then cooled to 80°C under nitrogen and slowly added to a mixture of 177 parts of diphenylmethane-4,4'-diisocyanate, 0.051 parts of 2,6-di-tert.-butyl p-cresol and 0.0255 parts of benzoyl chloride at 50°C. The temperature of the mixture was adjusted to 80°C and maintained at this level for a further 1½ hours, the pressure being held at 100 mm.Hg. A further 8 parts of diphenylmethane-4,4'-diisocyanate were added in order to adjust the isocyanate content of the prepolymer to 12.11 percent. The prepolymer was then cooled to 70°C under dry nitrogen at a pressure of 100 mm.Hg. The pressure was then readjusted to atmospheric pressure with dry nitrogen and the prepolymer was metered, using a gear pump via a heat exchange unit which increased its temperature to 104°C., to a mixing head at the rate of 1.3509 parts per minute. 1,4-Butane diol at 70°C in a separate hold vessel was metered independently to the mixing head at the rate of 0.1806 parts per minute. The residence time in the mixing head was approximately 3 seconds and the mixture left the head at 112°C and was discharged on to a heated polytetrafluoroethylene-coated glass cloth belt. The product remained on the belt for approximately 10 minutes, and on discharge from the belt the solid material was granulated and stored in sealed containers for several days. When tested for solubility in dimethyl formamide by tumble mixing and heavy duty mixing the product was found to be insoluble, although an excess of hydroxyl groups over isocyanate groups had been present.

The insoluble polyurethane was then injection moulded at 180°–190°C, the residence time in the barrel of the injection moulding machine being approximately 3 minutes. The resulting elastomer was then found to be readily soluble in dimethyl formamide and gave a solution having a viscosity of 20 poises at 25°C and at 20 percent solids content.

Films were cast from this solution and had the following physical properties, which are compared with the physical properties of the elastomer after injection moulding but not cast.

|  | Tensile Strength (Kg/cm²) | Elongation at break (%) | Permanent Set (%) | Modulus | | |
|---|---|---|---|---|---|---|
|  |  |  |  | 100 % | 300 % | 500 % |
| Cast | 400 | 550 | 110 | 92 | 185 | 330 |
| Injection Moulding | 190 | 400 | 100 | 144 | 168 | — |

EXAMPLE 2

237 Parts of a polypropylene glycol having a hydroxyl value of 59.3 mg.KOH/g. were dehydrated by agitation at 110°C at a pressure of 100 mm.Hg. until the moisture content was less than 0.015 percent. The dry glycol was then cooled to 80°C under nitrogen and slowly added to a mixture of 177 parts of diphenylmethane-4,4'-diisocyanate, 0.051 parts of 2,6-di-tert.-butyl p-cresol and 0.0255 parts of benzoyl chloride at 50°C. The temperature of the mixture was adjusted to 80°C and maintained at this level for a further 1½ hours, the pressure being held at 100 mm.Hg. A further 8 parts of diphenylmethane-4,4'-diisocyanate were added in order to adjust the isocyanate content of the prepolymer to 12.11 percent. The prepolymer was then cooled to 70°C under dry nitrogen at a pressure of 100 mm.Hg. The pressure was then readjusted to atmospheric pressure with dry nitrogen and the prepolymer then metered, using a gear pump via a heat exchange unit which increased its temperature to 104°C., to a mixing head at the rate of 1.3509 parts per minute. 1,4-Butane diol at 70°C in a separate hold vessel was metered independently to the mixing head at the rate of 0.1766 parts per minute. The residence time in the mixing head was approximately 3 seconds and the mixture left the head at 112°C and was discharged on to a heated polytetrafluoroethylene-coated glass cloth belt. The product remained on the belt for approximately 10 minutes, and on discharge from the belt the solid material was granulated and stored in sealed containers for several days. When tested for solubility in dimethyl formamide by tumble mixing and heavy duty mixing the product was found to be insoluble, although an excess of hydroxyl groups over isocyanate groups had been present.

The insoluble polyurethane was then injection moulded at 180°-190°C, the residence time in the barrel of the injection moulding machine being approximately 3 minutes. The resulting elastomer was then found to be readily soluble in dimethyl formamide and gave a solution having a viscosity of 40 poises at 25°C and at 20 percent solids content.

Films were cast from this solution and had the following physical properties, which are compared with the physical properties of the elastomer after injection moulding but not cast.

|  | Tensile Strength (kg/cm²) | Elongation at Break (%) | Modulus | |
|---|---|---|---|---|
|  |  |  | 100 % | 300 % |
| Cast | 360 | 450 | 85 | 210 |
| Injection Moulding | 190 | 440 | 144 | 168 |

EXAMPLE 3

200 Parts of a polypropylene glycol having a hydroxyl value of 59.3 mg.KOH/g. were dehydrated by agitation at 110°C at a pressure of 100 mm.Hg. until the moisture content was less than 0.03 percent. The dry glycol was then cooled to 80°C under nitrogen and slowly added to a mixture of 101 parts of diphenylmethane-4,4'-diisocyanate, 0.03 parts of 2,6-di-tert.-butyl p-cresol and 0.015 parts of benzoyl chloride at 50°C. The temperature of the mixture was adjusted to 80°C and maintained at this level for a further 1½ hours, the pressure being held at 100 mm.Hg. A further 6.9 parts of diphenylmethane-4,4'-diisocyanate were added in order to adjust the isocyanate content of the prepolymer to 8.73 percent. The prepolymer was then cooled to 70°C. under dry nitrogen at a pressure of 100 mm.Hg. The pressure was then readjusted to atmospheric with dry nitrogen and the prepolymer metered, using a gear pump via a heat exchange unit which increased its temperature to 113°C, to a mixing head at the rate of 1.4846 parts per minute. 1,4-Butane diol at 70°C in a separate hold vessel was metered independently to the mixing head at the rate of 0.1399 parts per minute. The residence time in the mixing head was approximately 3 seconds and the mixture left the head at 112°C and was discharged on to a heated polytetrafluoroethylene-coated glass cloth belt. The product remained on the belt for approximately 10 minutes, and on discharge from the belt the solid material was granulated and stored in sealed containers for several days. When tested for solubility in dimethyl formamide by tumble mixing and heavy duty mixing the product was found to be insoluble, although an excess of hydroxyl groups over isocyanate groups had been present.

The insoluble polyurethane was then injection moulded at 160°-170°C, the residence time in the barrel of the injection moulding machine being approximately 3 minutes. The resulting elastomer was then found to be readily soluble in dimethyl formamide and gave a solution having a viscosity of 45 poises at 25°C and at 30 percent solids content.

Films were cast from this solution and had the following physical properties, which are compared with the physical properties of the elastomer after injection moulding but not cast.

|  | Tensile Strength (Kg/cm²) | Elongation at Break (%) | Modulus | | |
|---|---|---|---|---|---|
|  |  |  | 100% | 300% | 500% |
| Cast | 260 | 650 | 34 | 95 | 180 |
| Injection Moulding | 144 | 325 | 95 | 130 | — |

EXAMPLE 4

258.5 Parts of a polypropylene glycol having a hydroxyl value of 59.3 mg.KOH/g. were dehydrated by agitation at 110°C at a pressure of 100 mm.Hg. until the moisture content was less than 0.010 percent. The dry glycol was then cooled to 80°C under nitrogen and slowly added to a mixture of 195.5 parts of diphenylmethane-4,4'-diisocyanate, 0.0577 parts of 2,6-di-tert.-butyl p-cresol and 0.0288 parts of benzoyl chloride at 50°C. The temperature of the mixture was adjusted to 80°C. and maintained at this level for a further 1½ hours, the pressure being held at 100 mm.Hg. A further 8 parts of diphenylmethane-4,4'-diisocyanate were added in order to adjust the isocyanate content of the prepolymer to 12.11 percent. The prepolymer was then cooled to 70°C under dry nitrogen at a pressure of 100 mm.Hg. The pressure was then readjusted to atmospheric pressure with dry nitrogen and the prepolymer metered, using a gear pump via a heat exchange unit which increased its temperature to 97°C, to a mixing head at the rate of 1.5382 parts per minute. 1,4-Butane diol at 70°C in a separate hold vessel was metered independently to the mixing head at the rate of 0.2037 parts per minute. The residence time in the mixing head was approximately 3 seconds and the mixture left the head at 106°C and was discharged on to a heated polytetrafluoroethylene-coated glass cloth belt. The product remained on the belt for approximately 10 minutes, and on discharge from the belt the solid material was granulated and stored in sealed containers for several days. When tested for solubility in dimethyl formamide by tumble mixing and heavy duty mixing the product was found to be insoluble, although an excess of hydroxyl groups over isocyanate groups had been present.

The insoluble polyurethane was then extruded at 210°–215°C, the residence time in the barrel of the extruder being approximately 4 minutes. The resulting elastomer was then found to be readily soluble in dimethyl formamide and gave a solution having a viscosity of 10 poises at 25°C and at 20 percent solids content.

Films were cast from this solution and had the following physical properties.

|  | Tensile Strength (Kg/cm²) | Elongation at Break (%) | Perm-anent Set(%) | Modulus | | |
|---|---|---|---|---|---|---|
|  |  |  |  | 100% | 300% | 500% |
| Cast | 390 | 560 | 105 | 100 | 175 | 340 |

EXAMPLE 5

233 Parts of a polypropylene glycol having a hydroxyl value of 59.3 mg.KOH/g. were dehydrated by agitation at 110°C at a pressure of 100 mm.Hg until the moisture content was less than 0.015 percent. The dry glycol was then cooled to 80°C under nitrogen and slowly added to a mixture of 105 parts of diphenylmethane 4,4'-diisocyanate, 0.0308 parts of 2,6-di-tert.-butyl p-cresol and 0.0154 parts of benzoyl chloride at 50°C. The temperature of the mixture was adjusted to 80°C and maintained at this level for a further 1½ hours, the pressure being held at 100 mm.Hg. A further 22.75 parts of diphenylmethane-4,4'-diisocyanate were added in order to adjust the isocyanate content of the prepolymer to 8.73 percent. The prepolymer was then cooled to 70°C under dry nitrogen at a pressure of 100 mm.Hg. The pressure was then readjusted to atmospheric with dry nitrogen and the prepolymer metered, using a gear pump via a heat exchange unit which increased its temperature to 118°C, to a mixing head at the rate of 1.5235 parts per minute. 1,4-Butane diol at 70°C in a separate hold vessel was metered independently to the mixing head at the rate of 0.1454 parts per minute. The residence time in mixing head was approximately 3 seconds and the mixture left the head at 140°C. and was discharged on to a heated polytetrafluoroethylene-coated glass cloth belt. The product remained on the belt for approximately 10 minutes, and on discharge from the belt the solid material was granulated and stored in sealed containers for several days. When tested for solubility in dimethyl formamide by tumble mixing and heavy duty mixing the product was found to be insoluble, although an excess of hydroxyl groups over isocyanate groups had been present.

The insoluble polyurethane was then extruded at 210°–215°C, the residence time in the barrel of the extruder being approximately 15 minutes. The resulting elastomer was then found to be readily soluble in dimethyl formamide and gave a solution having a viscosity of 5 poises at 25°C and at 20 percent solids content.

Films were cast from this solution and had the following physical properties, which are compared with the physical properties of the elastomer after injection moulding but not cast.

|  | Tensile Strength (Kg/cm²) | Elongation at Break (%) | Modulus | | |
|---|---|---|---|---|---|
|  |  |  | 100% | 300% | 500% |
| Cast | 230 | 670 | 20 | 90 | 150 |
| Injection Moulding | 145 | 570 | 80 | 110 | 147 |

We claim:

1. A process for the manufacture of solvent-soluble polyurethane elastomers from polypropylene glycol having a molecular weight of 1,000–2,500, a diol having a molecular weight of at most 250 and an organic diisocyanate in amount at most equivalent to the polypropylene glycol and the diol together, which comprises (1) reacting together the organic diisocyanate and the polypropylene glycol in the absence of solvent to form an isocyanate-ended prepolymer, (2) further reacting the prepolymer with the diol in the absence of solvent to form a solvent-insoluble polyurethane product, (3) heating the solvent-insoluble polyurethane product in the absence of solvent until a product is obtained which is soluble in dimethyl formamide, dimethyl acetamide or dimethyl sulfoxide, (4) dissolving the solvent-soluble product in a solvent therefore and (5) removing the solvent to produce a solid polyurethane product.

2. A process as claimed in claim 1 wherein the solvent-insoluble polyurethane product is mechanically worked during the heating stage.

3. A process as claimed in claim 1 wherein the polymeric polyol is a polypropylene glycol having a molecular weight between 1,000 and 2,500.

4. A process as claimed in claim 1 wherein the reaction between the prepolymer and the diol is carried out by mixing the diol, at a temperature of from 10° to 150°C, with the prepolymer heated to a temperature of from 60° to 150°C and holding the mixture at a temperature of from 70° to 170°C until it solidifies.

5. A process as claimed in claim 1 wherein the reaction between the prepolymer and the diol is carried out continuously by independently feeding the prepolymer and the diol to a heated mixing chamber, the liquid mixture then issuing on to a moving belt which passes over a platen heated to provide a temperature not exceeding 170°C in the mixture, whereby the mixture solidifies.

6. A process as claimed in claim 1 wherein the reaction between the prepolymer and the diol is completed by heating the solid product at a temperature up to 120°C for a period of up to 40 hours.

7. A process as claimed in claim 1 wherein the solvent-insoluble polyurethane product is converted into a solvent-soluble product by heating at a temperature of from 180° to 220°C for from 1 to 60 minutes.

8. A process as claimed in claim 1 wherein mechanical working of the heated solvent-insoluble polyurethane product is carried out by subjecting the product to an injection moulding operation at a temperature of 180° to 190°C.

9. A process as claimed in claim 2 wherein mechanical working of the heated solvent-insoluble polyurethane product is carried out by passing the product through a heated barrel by means of a screwed or scrolled axially rotatable shaft at a temperature of 200° to 210°C.

10. Solvent-soluble polyurethane elastomers obtained by a process as claimed in claim 1.

* * * * *